US012103597B2

(12) United States Patent
Tsujikawa

(10) Patent No.: US 12,103,597 B2
(45) Date of Patent: Oct. 1, 2024

(54) VEHICLE-MOUNTED COMPONENT ATTACHMENT STRUCTURE AND VEHICLE-MOUNTED COMPONENT ATTACHMENT METHOD

(71) Applicant: TOYOTA JIDOSHA KABUSHIKI KAISHA, Toyota (JP)

(72) Inventor: Yohichi Tsujikawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 314 days.

(21) Appl. No.: 17/817,807

(22) Filed: Aug. 5, 2022

(65) Prior Publication Data

US 2023/0094731 A1  Mar. 30, 2023

(30) Foreign Application Priority Data

Sep. 28, 2021 (JP) .................. 2021-158476

(51) Int. Cl.
  *B60J 5/04* (2006.01)
  *B62D 27/02* (2006.01)
  *H01Q 1/32* (2006.01)

(52) U.S. Cl.
  CPC ............ *B62D 27/02* (2013.01); *B60J 5/0468* (2013.01); *H01Q 1/3283* (2013.01); *H01Q 1/3291* (2013.01)

(58) Field of Classification Search
  CPC ..... B60J 5/0468; H01Q 1/325; H01Q 1/3283; H01Q 1/3291
  USPC ................................ 343/711, 713
  See application file for complete search history.

(56) References Cited

U.S. PATENT DOCUMENTS 8,264,420 B2 * 9/2012 Sato ...................... H01Q 1/3275
  343/711
8,817,482 B2 * 8/2014 Onishi ................. H05K 5/0013
  361/752

FOREIGN PATENT DOCUMENTS

JP  2012111413 A  6/2012

OTHER PUBLICATIONS

CN1040002634 Text (Year: 2010).*
DE102008058907 Text (Year: 2014).*
JP2014046719 Text (Year: 2014).*
JP2597597 Text (Year: 1999).*

* cited by examiner

*Primary Examiner* — Dennis H Pedder
(74) *Attorney, Agent, or Firm* — Dickinson Wright, PLLC

(57) ABSTRACT

A vehicle-mounted component attachment structure including a configuration member of a vehicle, a vehicle-mounted component, and a fixing member. The configuration member has plural recesses spaced apart from one another in a predetermined direction and formed in a fixing face that configures a part of a surface of the configuration member. The vehicle-mounted component includes plural protrusions corresponding to the plural recesses. The fixing member is configured such that one face of the fixing member is fixed to a location of the vehicle-mounted component positioned between the plural protrusions. Another face of the fixing member is spaced apart from the fixing face when the plural protrusions are contacting the fixing face, and the other face of the fixing member is fixed in a contact state to the fixing face when the plural protrusions have been positioned in the corresponding plural recesses.

10 Claims, 11 Drawing Sheets

VEHICLE-MOUNTED COMPONENT ATTACHMENT STRUCTURE AND VEHICLE-MOUNTED COMPONENT ATTACHMENT METHOD

CROSS-REFERENCE TO RELATED APPLICATION

This application is based on and claims priority under 35 USC 119 from Japanese Patent Application No. 2021-158476 filed on Sep. 28, 2021, the disclosure of which is incorporated by reference herein.

BACKGROUND

Technical Field

The present disclosure relates to a vehicle-mounted component attachment structure and a vehicle-mounted component attachment method.

Related Art

Japanese Patent Application Laid-Open (JP-A) No. 2012-111413 discloses an invention in which a double-sided tape is adhered to a bottom face and a side face of a housing that houses a loop antenna, and the housing is fixed to both a door trim and a pillar of a vehicle using this double-sided tape.

The door trim and the pillar are visible from the vehicle exterior. Thus, an assembly worker is able to execute an operation to fix the housing to the door trim and the pillar while visually confirming the locations where the double-sided tape is to be fixed to the door trim and the pillar.

The invention of JP-A No. 2012-111413 leaves room for improvement regarding easily executing an operation to fix a vehicle-mounted component to a vehicle location that is hard to see.

In consideration of the above circumstances, an object of the present disclosure is to obtain a vehicle-mounted component attachment structure and a vehicle-mounted component attachment method that enable a vehicle-mounted component to be easily fixed to a vehicle location that is hard to see.

SUMMARY

A vehicle-mounted component attachment structure according to a first aspect of the present disclosure includes a configuration member of a vehicle, a vehicle-mounted component, and a fixing member. The configuration member has plural recesses spaced apart from one another in a predetermined direction and formed in a fixing face that configures a part of a surface of the configuration member. The vehicle-mounted component includes plural protrusions corresponding to the plural recesses. The fixing member is configured such that one face of the fixing member is fixed to a location of the vehicle-mounted component positioned between the plural protrusions. Another face of the fixing member is spaced apart from the fixing face when the plural protrusions are contacting the fixing face, and the other face of the fixing member is fixed in a contact state to the fixing face when the plural protrusions have been positioned in the corresponding plural recesses.

In the vehicle-mounted component attachment structure according to the first aspect of the present disclosure, when the plural protrusions of the vehicle-mounted component are in contact with the fixing face of the configuration member, the fixing member that has the one face fixed to the vehicle-mounted component is spaced apart from the fixing face. Furthermore, when the plural protrusions have been positioned in the plural corresponding recesses by for example moving the vehicle-mounted component in the predetermined direction relative to the configuration member while maintaining the contact state between the fixing face and the protrusions, the other face of the fixing member is fixed to the fixing face. Thus, in the vehicle-mounted component attachment structure according to the first aspect of the present disclosure, an assembly worker is able to easily fix the vehicle-mounted component to the fixing face of the configuration member, even in cases in which it is difficult for the assembly worker to see the fixing face.

A vehicle-mounted component attachment structure according to a second aspect of the present disclosure is the first aspect of the present disclosure, wherein a receiving recess that is capable of receiving the vehicle-mounted component is formed in the surface of the configuration member. The fixing face and the plural recesses are formed to a bottom face of the receiving recess.

In the second aspect of the present disclosure, a projection amount of the vehicle-mounted component with respect to the surface of the configuration member when the vehicle-mounted component has been fixed to the fixing face using the fixing member is less than in cases in which the receiving recess is not provided. This reduces the risk of the vehicle-mounted component interfering with members other than the configuration member.

A vehicle-mounted component attachment structure according to a third aspect of the present disclosure is the first aspect of the present disclosure, wherein the predetermined direction is a vertical direction.

In the third aspect of the present disclosure, the respective protrusions can be made to enter the corresponding recesses in the fixing face by sliding the vehicle-mounted component in the vertical direction while making the plural protrusions of the vehicle-mounted component that are spaced apart from one another in the vertical direction contact the fixing face. Namely, the vehicle-mounted component can be easily fixed at a desired position on the configuration member using the fixing member by sliding the vehicle-mounted component in the vertical direction.

A vehicle-mounted component attachment structure according to a fourth aspect of the present disclosure is the first aspect of the present disclosure, wherein the vehicle-mounted component is a receiver device capable of receiving a wireless signal from communication equipment.

In the fourth aspect of the present disclosure, the assembly worker is able to easily fix the receiver device to the fixing face of the configuration member, even in cases in which it is difficult for the assembly worker to see the fixing face.

A vehicle-mounted component attachment structure according to a fifth aspect of the present disclosure is the fourth aspect of the present disclosure, wherein the fixing face is formed at a part of a vehicle outer side face of the configuration member. A cover member made of resin and configured to cover the receiver device from a vehicle outer side is attached to the vehicle outer side face of the configuration member.

In the fifth aspect of the present disclosure, the resin cover member that covers the receiver device from the vehicle outer side is attached to the vehicle outer side face of the configuration member. Exposure of the receiver device at the vehicle outer side is thereby prevented by the cover member. Furthermore, the resin cover member does not impair the exchange of wireless signals (radio waves) between communication equipment and the receiver device, and so the receiver device is able to receive wireless signals transmitted by such communication equipment.

A vehicle-mounted component attachment structure according to a sixth aspect of the present disclosure is the fifth aspect of the present disclosure, wherein the configuration member is a side sash made of metal and configuring a part of a vehicle door. The cover member is a pillar garnish configured to cover a vehicle outer side face of the side sash.

In the sixth aspect of the present disclosure, the resin pillar garnish that covers the receiver device from the vehicle outer side is attached to the vehicle outer side face of the side sash. Exposure of the receiver device at the vehicle outer side is thereby prevented by the pillar garnish. Furthermore, the resin pillar garnish does not impair the exchange of wireless signals (radio waves) between communication equipment and the receiver device, and so the receiver device is able to receive wireless signals transmitted by such communication equipment.

A vehicle-mounted component attachment structure according to a seventh aspect of the present disclosure is the first aspect of the present disclosure, wherein the configuration member includes a first positioning face capable of contacting a front face or a rear face of the vehicle-mounted component.

In the seventh aspect of the present disclosure, the configuration member includes the first positioning face that is capable of contacting the front face or rear face of the vehicle-mounted component. Movement of the vehicle-mounted component toward the front or rear relative to the configuration member is thereby restricted by the first positioning face.

A vehicle-mounted component attachment structure according to an eighth aspect of the present disclosure is the first aspect of the present disclosure, wherein the fixing face of the configuration member configures a second positioning face positioned further toward a vehicle inner side in a vehicle width direction than the vehicle-mounted component.

In the eighth aspect of the present disclosure, the fixing face of the configuration member configures the second positioning face that is positioned further toward the vehicle inner side in the vehicle width direction than the vehicle-mounted component. Movement of the vehicle-mounted component toward the vehicle inner side in the vehicle width direction relative to the configuration member is thereby restricted by the second positioning face.

A vehicle-mounted component attachment structure according to a ninth aspect of the present disclosure is the first aspect of the present disclosure, wherein when the other face has been fixed to the fixing face, leading ends of the plural protrusions are spaced apart from bottom faces of the corresponding plural recesses.

In the ninth aspect of the present disclosure, when the plural protrusions of the vehicle-mounted component have been positioned in the corresponding plural recesses of the configuration member, the other face of the fixing member more readily contacts the fixing face of the configuration member. Thus, in the vehicle-mounted component attachment structure according to the ninth aspect of the present disclosure, the vehicle-mounted component can be reliably fixed to the fixing face of the configuration member, even in cases in which it is difficult for the assembly worker to see the fixing face.

A vehicle-mounted component attachment method according to the invention of a tenth aspect of the present disclosure includes: causing plural protrusions provided to a vehicle-mounted component to contact a fixing face that configures a part of a surface of a configuration member of a vehicle and that is formed with plural recesses spaced apart from one another in a predetermined direction, such that a fixing member that has one face fixed to a location of the vehicle-mounted component positioned between the plural protrusions has another face spaced apart from the fixing face; causing the vehicle-mounted component to move in the predetermined direction relative to the configuration member while maintaining a state of contact between the fixing face and the plural protrusions; and fixing the other face of the fixing member in a contact state to the fixing face by positioning the plural protrusions in the corresponding plural recesses.

As described above, the vehicle-mounted component attachment structure and the vehicle-mounted component attachment method according to the present disclosure exhibit an excellent advantageous effect of enabling the vehicle-mounted component to be easily fixed to a vehicle location that is hard to see.

BRIEF DESCRIPTION OF THE DRAWINGS

Exemplary embodiments of the present invention will be described in detail based on the following figures, wherein.

DETAILED DESCRIPTION

Figure 1:
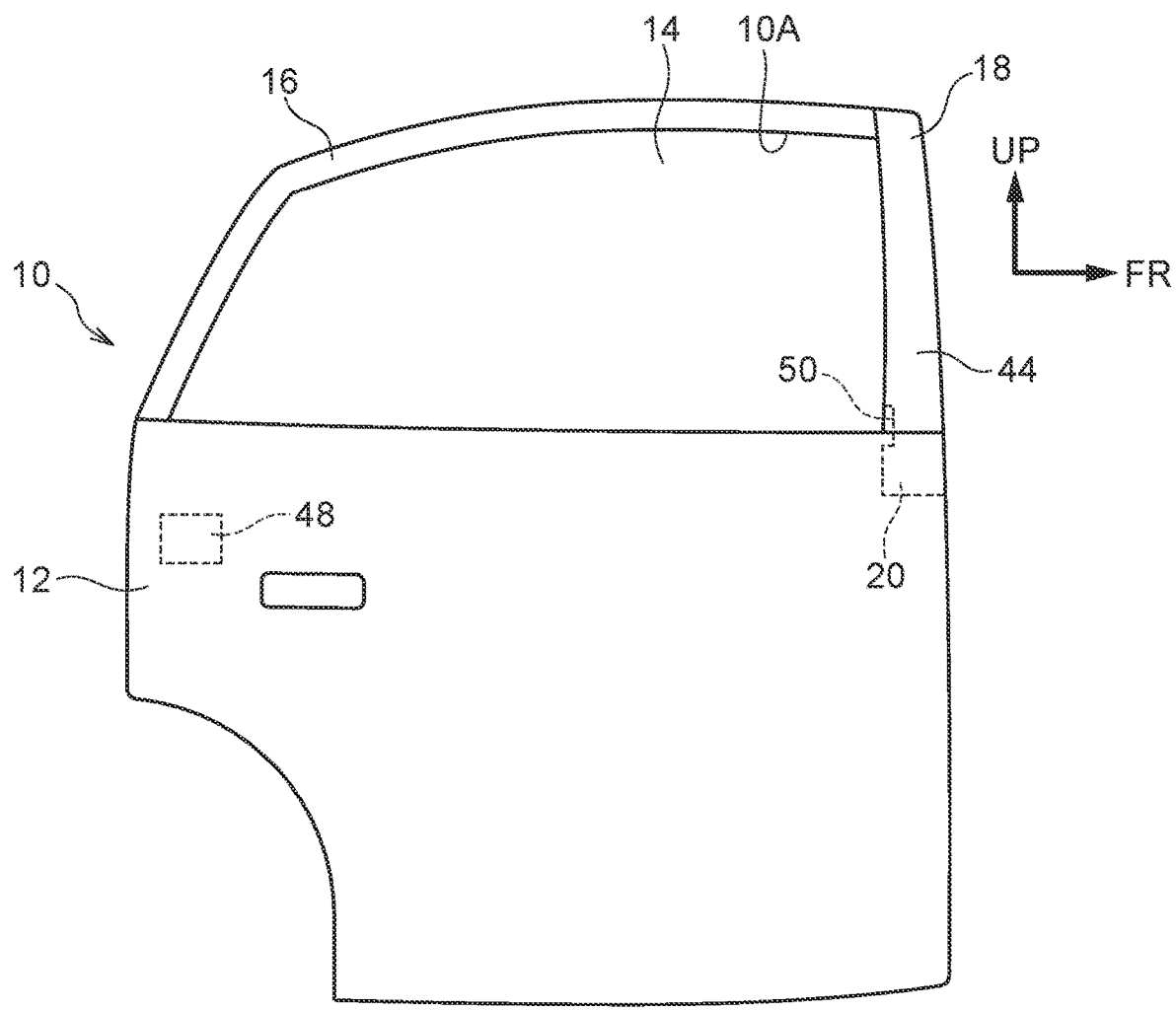
FIG. 1 is a side view illustrating a rear door on a right side of a vehicle applied with a vehicle-mounted component attachment structure according to an exemplary embodiment.

Explanation follows regarding an exemplary embodiment of a vehicle-mounted component attachment structure and a vehicle-mounted component attachment method according to the present disclosure, with reference to the drawings. Note that in the drawings, the arrow UP indicates an upper side in a vehicle vertical direction, the arrow FR indicates a front side in a vehicle front-rear direction, and the arrow LH indicates a left side in a vehicle left-right direction (vehicle width direction). In the following explanation, references to a vertical direction, a front-rear direction, and a left-right direction respectively refer to the vehicle vertical direction, the vehicle front-rear direction, and the vehicle left-right direction.

A rear door 10 illustrated in FIG. 1 is provided in an opening formed in a right side face of a vehicle of the present exemplary embodiment. The rear door 10 includes a door outer panel 12 made of metal and configuring a lower half of an outer face of the rear door 10, and a door frame 16 configuring an upper half of the rear door 10. A window hole 10A is formed between the door outer panel 12 and the door frame 16. The rear door 10 includes a sliding window 14 that is capable of sliding in the vertical direction. The sliding window 14 is capable of sliding between a fully closed position (the position in FIG. 1) that completely closes the window hole 10A, and a fully open position (not illustrated in the drawings) that opens the window hole 10A.

Figure 2:
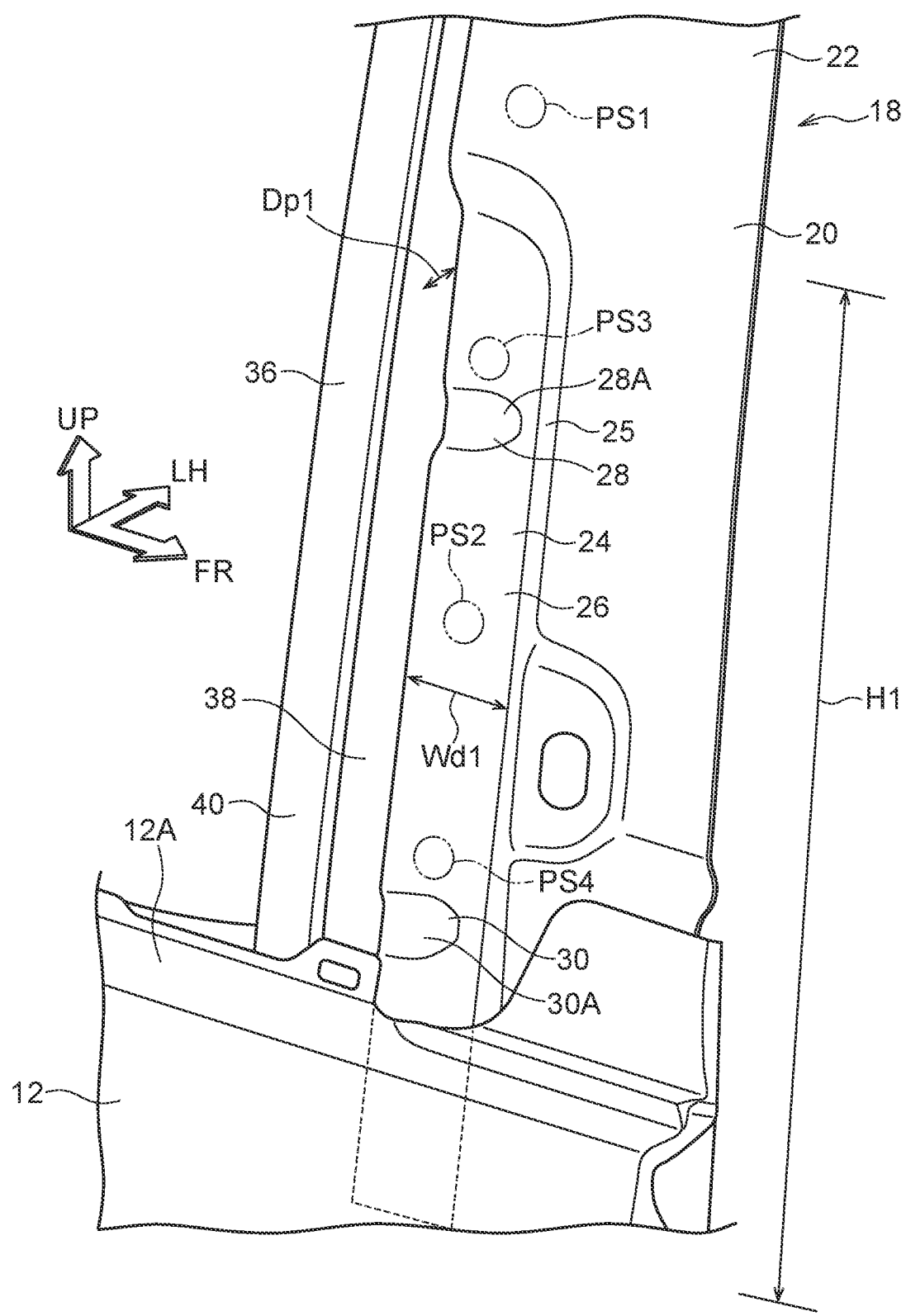
FIG. 2 is a perspective view illustrating parts of a side sash, a glass run channel and a door outer panel of the rear door illustrated in FIG. 1 as viewed from a vehicle outer side.
Figure 7:
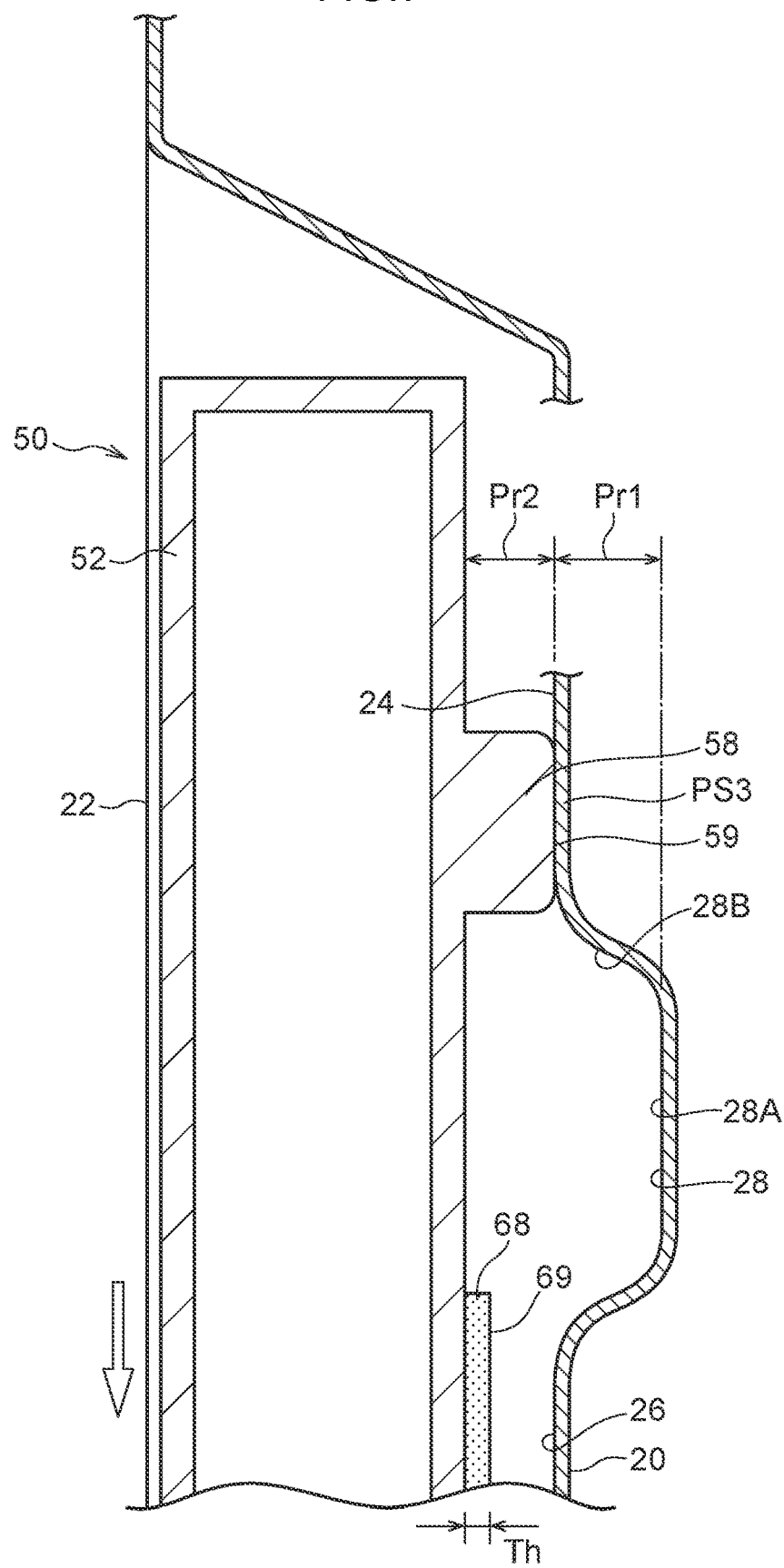
FIG. 7 is a cross-section schematically illustrating the receiver device and the side sash in a state when two protrusions are in contact with a fixing face.
Figure 8:
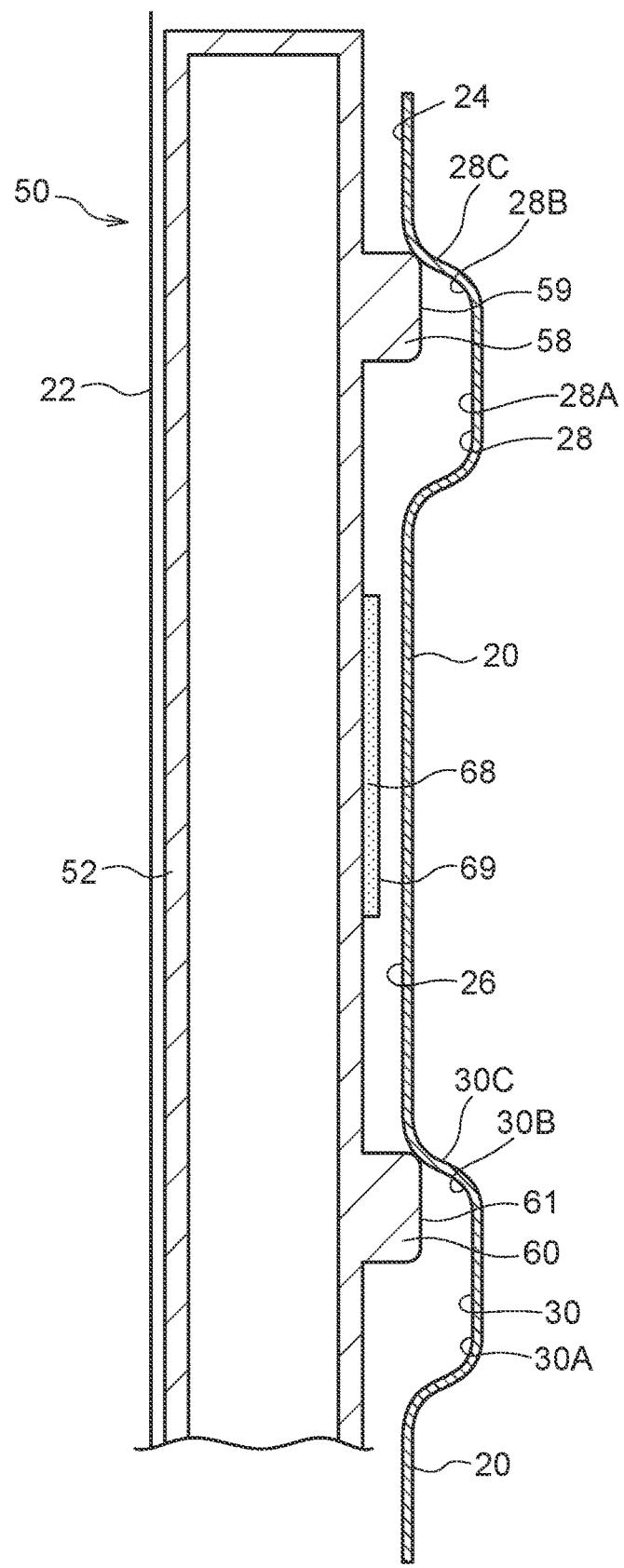
FIG. 8 is cross-section similar to that in FIG. 7, illustrating a state when the protrusions have started to enter recesses provided in the fixing face.
Figure 9:
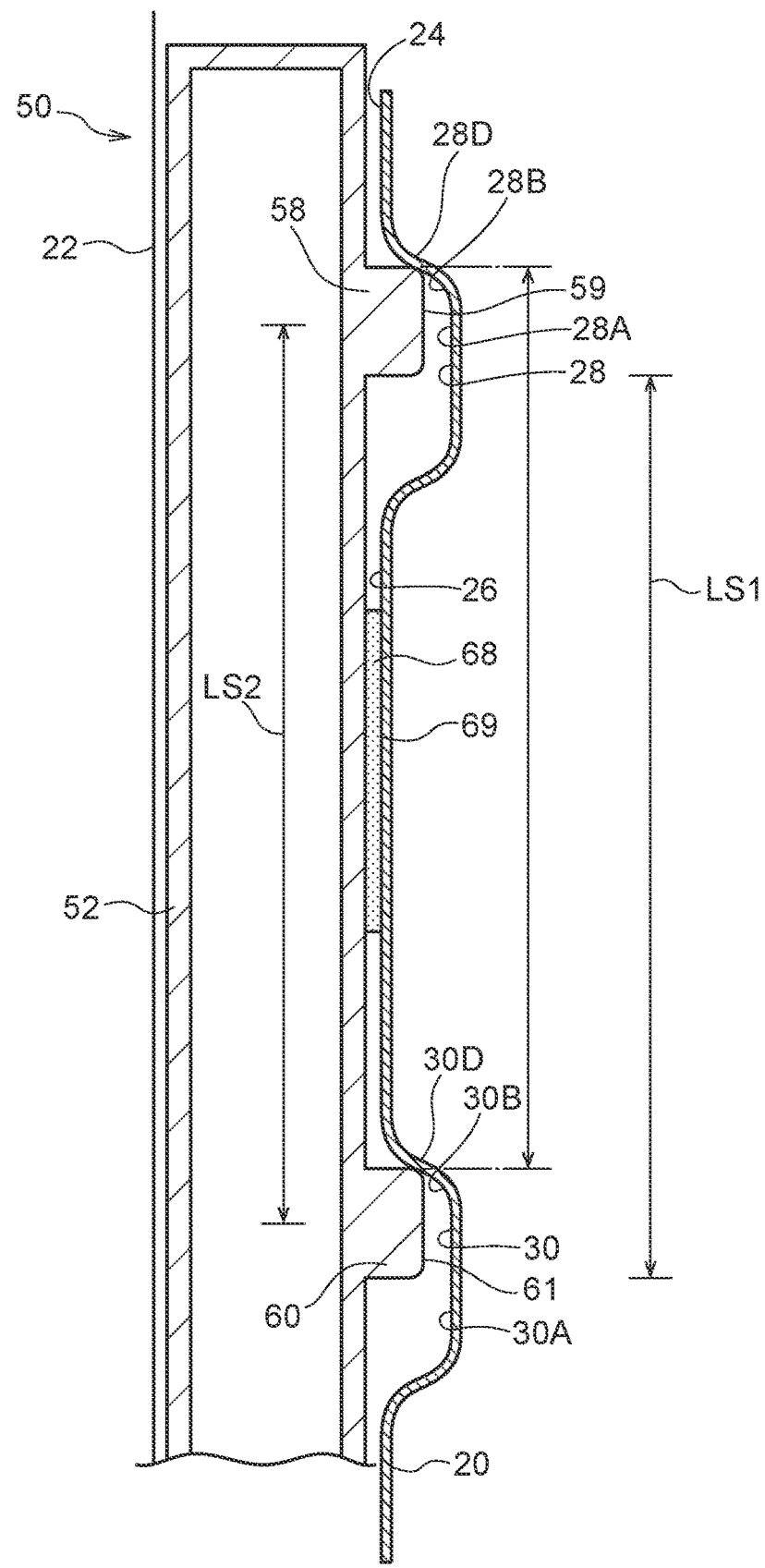
FIG. 9 is cross-section similar to that in FIG. 7, illustrating a state when double-sided tape provided to the receiver device has been fixed to the fixing face.

A front end portion of the door frame 16 extends along substantially the vertical direction and is configured by a B pillar 18. As illustrated in FIG. 2, the B pillar 18 includes a side sash (configuration member) 20 that is made of metal and extends along substantially the vertical direction. A lower end portion of a vehicle outer side face 22 of the side sash 20 is welded to an upper portion of a vehicle inner side face of the door outer panel 12. As is also illustrated in FIG. 2, a receiving recess 24 is formed extending along an extension direction of the side sash 20 at a rear edge of the lower end portion of the vehicle outer side face 22. A rear edge of the receiving recess 24 is open. Although not illustrated in the drawings, a lower edge of the receiving recess 24 is also open at the lower end portion of the side sash 20. However, an upper end portion and a front edge of the receiving recess 24 are blocked by a wall portion 25 connected to the vehicle outer side face 22. A bottom face of the receiving recess 24 is configured by a fixing face (second positioning face) 26 that is substantially parallel to the vehicle outer side face 22. A recess 28 and a recess 30 are respectively formed at two locations, these being an upper side and a lower side of the fixing face 26. As illustrated in FIG. 7 to FIG. 9, respective bottom faces 28A, 30A of the recess 28 and the recess 30 are planar faces that are substantially parallel to the fixing face 26. The recess 28 and the recess 30 also include respective inclined faces 28B, 30B that connect upper end portions of the bottom faces 28A, 30A to the fixing face 26. As illustrated in FIG. 2, H1 is a length direction dimension (vertical direction dimension) of the receiving recess 24, Wd1 is a width dimension (front-rear direction dimension) of the receiving recess 24, and Dp1 is a depth (left-right direction dimension) of the receiving recess 24. As illustrated in FIG. 7, Pr1 is a depth of the respective recesses 28, 30. As illustrated in FIG. 9, LS1 is a distance in the length direction of the side sash 20 between a center of the bottom face 28A of the recess 28 and a center of the bottom face 30A of the recess 30. As described later, a pillar garnish (cover member) 44 made of resin can be detachably attached to the vehicle outer side face 22 of the side sash 20.

A glass run channel-retaining member (configuration member) 36 that is made of metal and extends substantially along the vertical direction is positioned directly behind the side sash 20. A cross-section profile of the glass run channel-retaining member 36 sectioned along a horizontal plane is substantially U-shaped. Namely, the glass run channel-retaining member 36 includes a front wall (first positioning face) 38 configuring a front face thereof, an outer wall 40 with a front end portion connected to a vehicle outer side end portion (right side edge) of the front wall 38, and an inner wall (not illustrated in the drawings) with a front end portion connected to a vehicle inner side end portion (left side edge) of the front wall 38. A glass run channel (not illustrated in the drawings) configured of an elastic body is provided in a space surrounded by the front wall 38, the outer wall 40, and the inner wall. A front edge of the sliding window 14 is supported so as to be capable of sliding by the glass run channel. As illustrated in FIG. 2, a rear end face of the side sash 20 contacts a front face of the front wall 38 of the glass run channel-retaining member 36, and the rear end face of the side sash 20 is welded to the front face of the front wall 38. A lower end portion of the glass run channel-retaining member 36 is welded to an upper portion of a vehicle inner side face of the door outer panel 12.

As illustrated in FIG. 1, a door locking device 48 including an electronic actuator, a circuit board, and a connector is provided to the rear door 10. As is widely known, the door locking device 48 is capable of transitioning between a latched state in which the door locking device 48 grips a striker fixed to the vehicle body, and an unlatched state in which the door locking device 48 release the striker.

Figure 3:
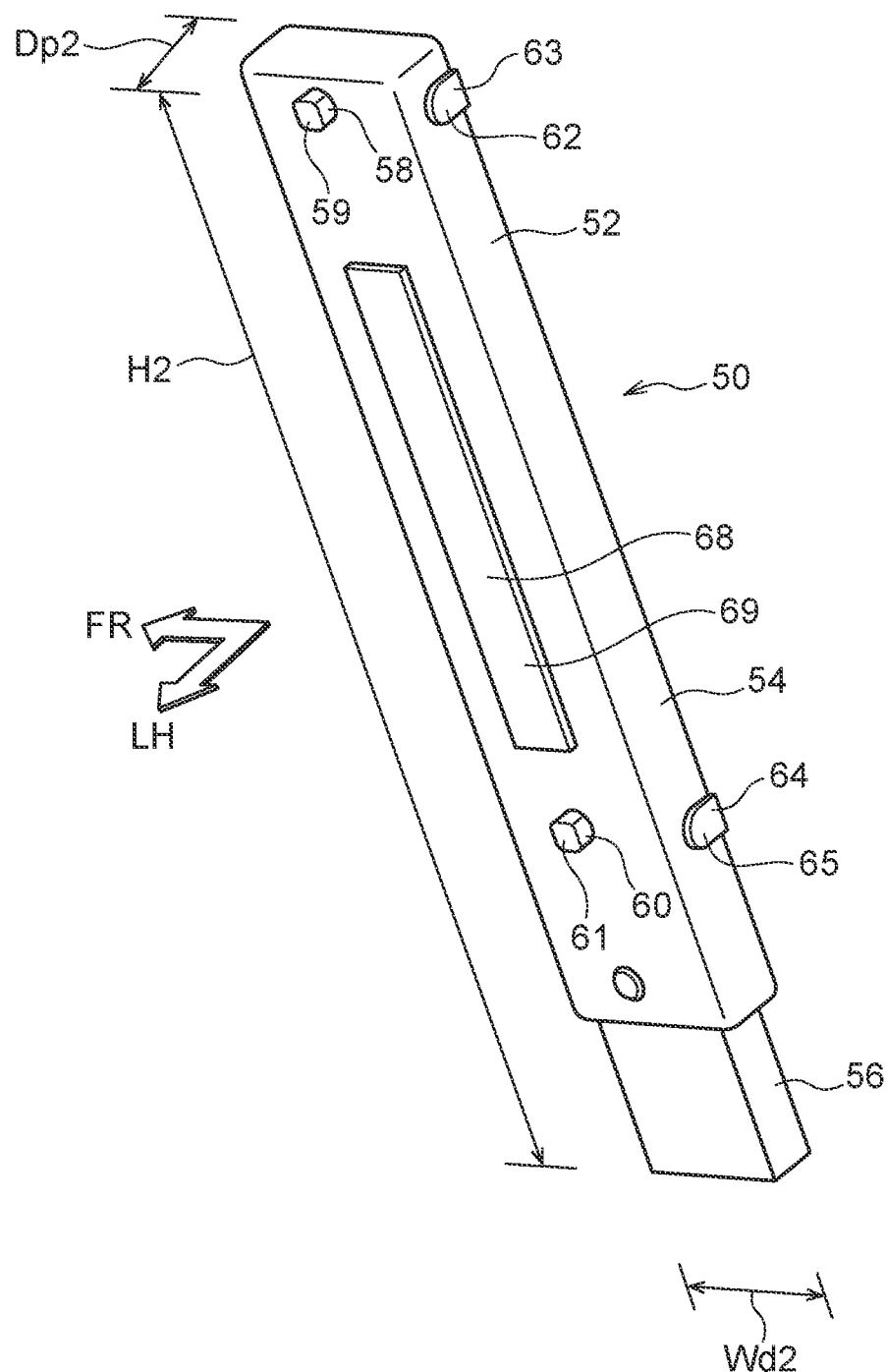
FIG. 3 is a perspective view illustrating a receiver device according to an exemplary embodiment.

A receiver device (vehicle-mounted component) 50 illustrated in FIG. 3 includes a case 52 that is hollow and made of resin. The case 52 includes a substantially rectangular main body section 54, and a connecting section 56 configuring a lower end portion of the case 52. A width dimension (front-rear direction dimension) and a thickness (left-right direction dimension) of the connecting section 56 are smaller than those of the main section 54. An upper and lower pair of protrusions 58, 60 are respectively provided to a left side face (vehicle inner side face) of the case 52. The protrusion 58 and the protrusion 60 have the same shape. A leading end face 59 of the protrusion 58 and a leading end face 61 of the protrusion 60 are planar faces that are parallel to one another. As illustrated in FIG. 7, Pr2 is a length (projection amount) of the protrusion 58 and the protrusion 60. As illustrated in FIG. 9, LS2 is a distance in the side sash 20-length direction between a center of the protrusion 58 and a center of the protrusion 60. This distance LS2 is equivalent to the distance LS1 in the side sash 20-length direction between the center of the bottom face 28A of the recess 28 and the center of the bottom face 30A of the recess 30.

The shape (outer profile) of the respective protrusions 58, 60 when viewed along the vehicle width direction is smaller than the shape (outer profile) of the respective recesses 28, 30 when viewed along the vehicle width direction. An upper and lower pair of side-portion projections 62, 64 are respectively provided to a both a front face and a rear face of the main section 54. The side-portion projections 62 and the side-portion projections 64 have the same shape. A leading end face 63 of each of the side-portion projections 62 and a leading end face 65 of each of the side-portion projections 64 are planar faces.

A double-sided tape (fixing member) 68 is fixed to the left side face of the case 52 so as to be positioned between the protrusion 58 and the protrusion 60. One thickness direction adhesive face (not illustrated in the drawings) of the double-sided tape 68 is adhered to the left side face of the case 52. An adhesive face 69 is provided at another thickness direction face (left side face) of the double-sided tape 68. As illustrated in FIG. 7, the length Pr2 of the protrusion 58 and the protrusion 60 is greater than a thickness Th of the double-sided tape 68. As illustrated in FIG. 3, Dp2 is a distance between the right side face of the case 52 and the leading end faces 59, 61 of the protrusions 58, 60, H2 is a length direction dimension (vertical direction dimension) of the case 52, and Wd2 is a distance (front-rear direction dimension) between the leading end faces 63, 65 of the side-portion projections 62, 64 on the front side and the corresponding leading end faces 63, 65 of the side-portion projections 62, 64 on the rear side. Furthermore, Dp1>Dp2, H1>H2, and Wd1>Wd2.

Figure 4:
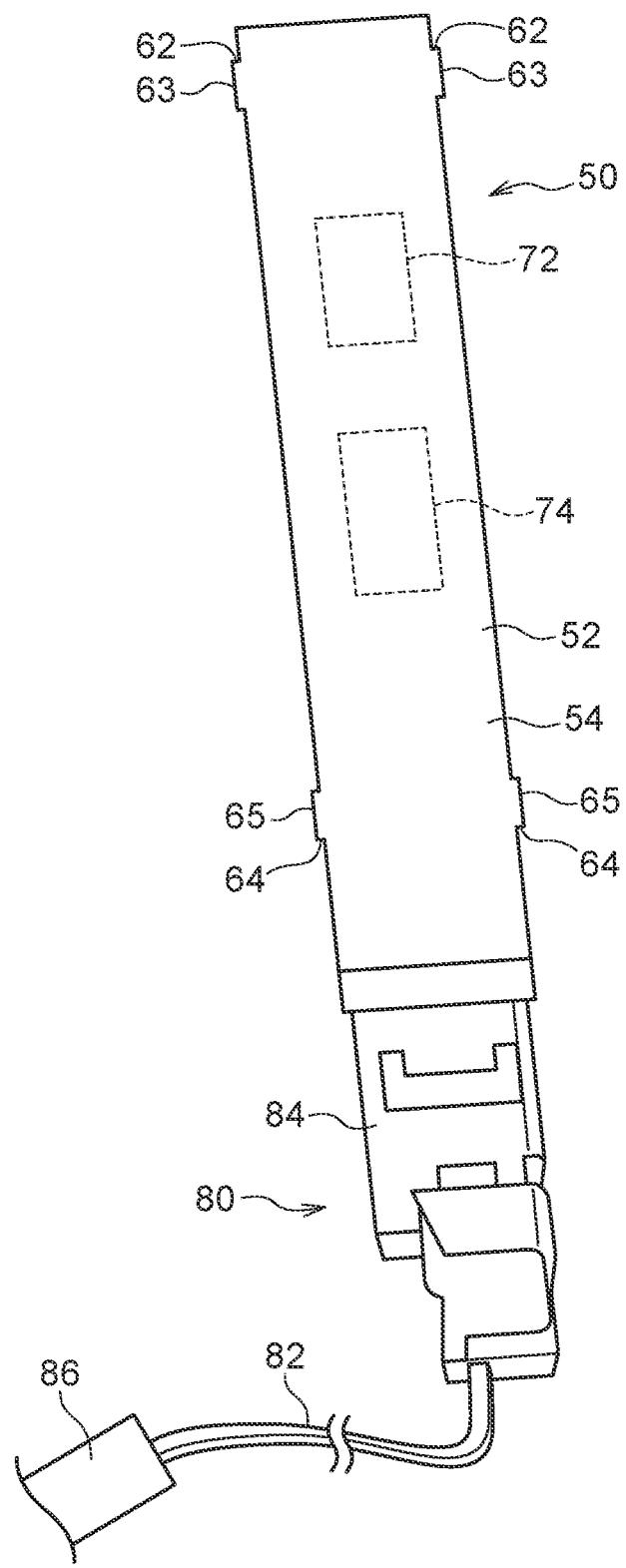
FIG. 4 is a perspective view illustrating the receiver device and a connector-attachment cable when viewed from a different direction than in FIG. 3.

As illustrated in FIG. 4, an antenna device 72 and an antenna control device 74 are provided in an inner area of the case 52. The antenna device 72 and the antenna control device 74 are electrically connected to one another. A terminal made of metal is provided in an inner area of the connecting section 56. The terminal is electrically connected to the antenna control device 74.

One end of a connector-attachment cable 80 illustrated in FIG. 4 is connected to the connecting section 56. The connector-attachment cable 80 includes a flexible electric cable 82, a connector 84 provided at one end of the electric cable 82, and a connector 86 provided at another end of the electric cable 82. A terminal made of metal is provided in an inner area of the connector 84. This terminal is connected to wiring provided in an inner area of the electric cable 82. When the connector 84 is connected to the connecting section 56 of the receiver device 50, the terminal of the connecting section 56 and the terminal of the connector 84 contact one another.

Operation and Advantageous Effects

Next, explanation follows regarding operation and advantageous effects of the present exemplary embodiment.

Explanation follows regarding a method of fixing the receiver device 50 that has been integrated with the connector-attachment cable 80 to the fixing face 26 of the receiving recess 24 in the side sash 20. An operation to fix the receiver device 50 to the fixing face 26 is executed prior to attaching the pillar garnish 44 to the side sash 20.

Figure 5:
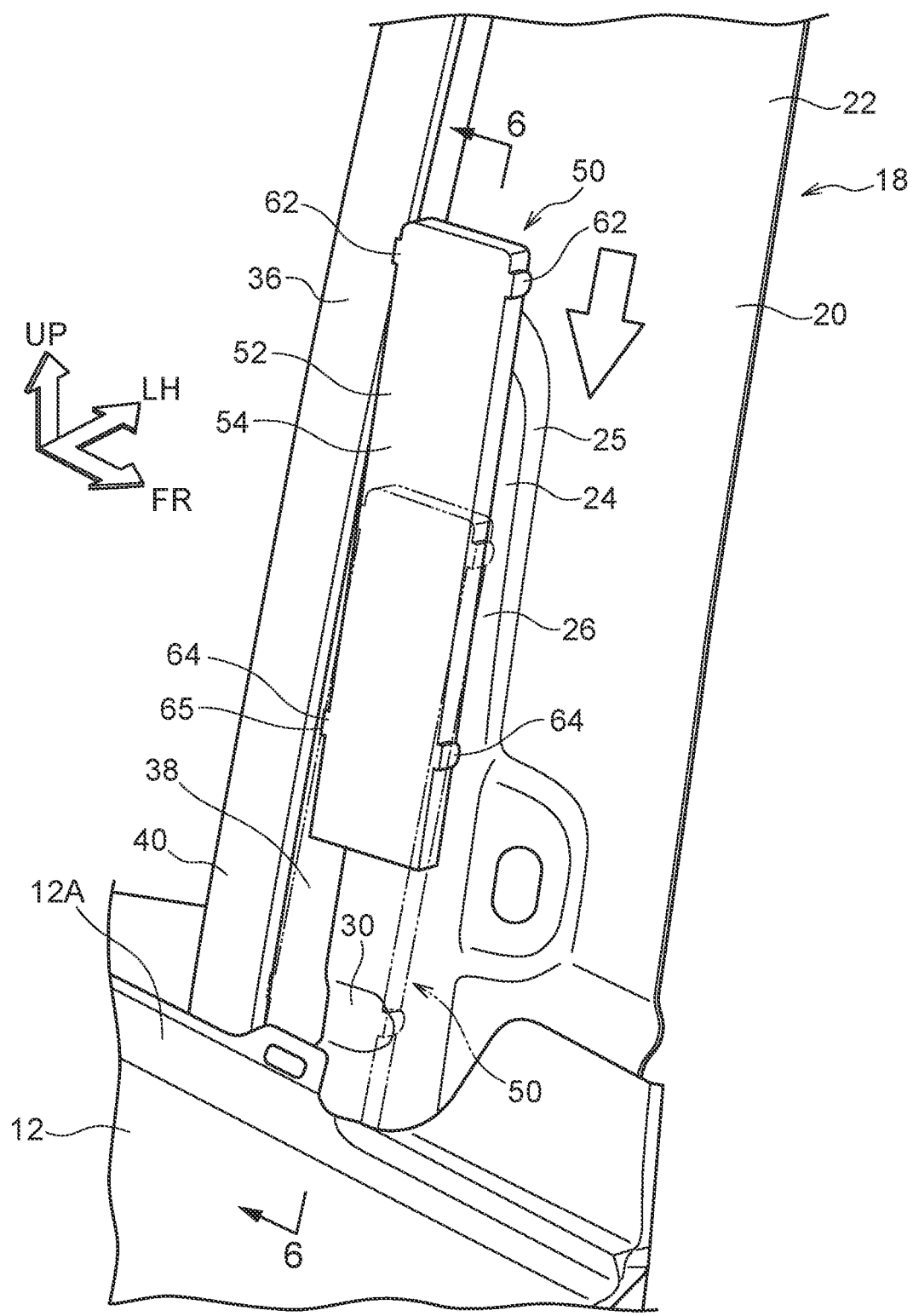
FIG. 5 is a perspective view similar to that in FIG. 2, illustrating parts of the receiver device, the side sash, the glass run channel and the door outer panel.
Figure 6:
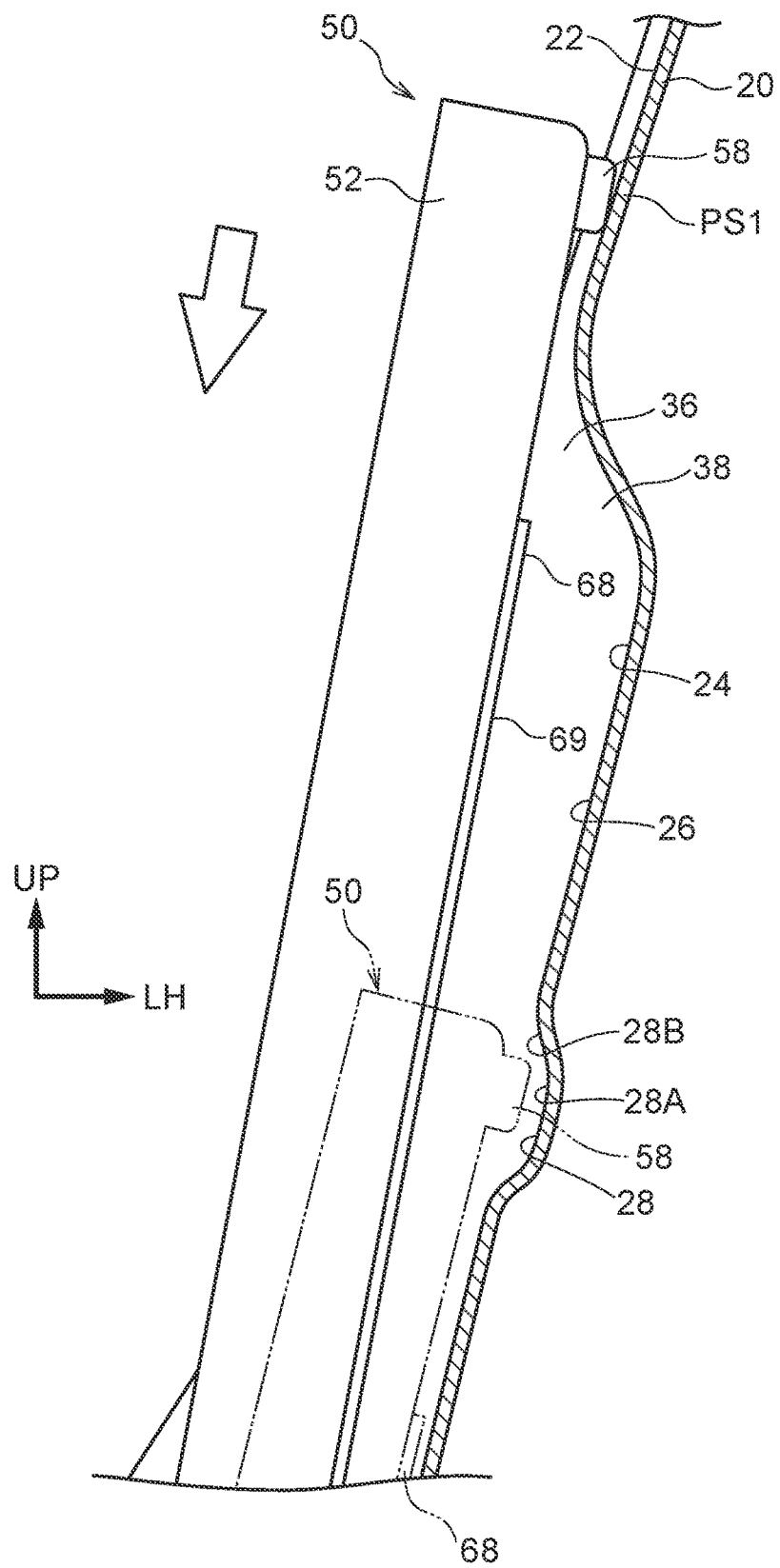
FIG. 6 is a cross-section section along arrows 6-6 in FIG. 5.

First, as illustrated in FIG. 5, a double-sided tape 68-side face of the receiver device 50 is brought near to the vehicle outer side face 22 of the side sash 20 from the vehicle outer side in a state in which the vehicle outer side face 22 is exposed. At this time, as illustrated in FIG. 5 and FIG. 6, the protrusion 58 is made to contact a location PS1 (see FIG. 2) further toward the upper side than the receiving recess 24 in the vehicle outer side face 22, and the protrusion 60 is made to contact a location PS2 (see FIG. 2) between the recess 28 and the recess 30 in the fixing face 26 of the receiving recess 24. When the receiver device 50 is viewed along the front-rear direction at this time, as illustrated in FIG. 5 and FIG. 6, the receiver device 50 (double-sided tape 68) is inclined with respect to the vehicle outer side face 22 and the fixing face 26 of the side sash 20. At this time, as illustrated in FIG. 6, the adhesive face 69 of the double-sided tape 68 is spaced apart from the vehicle outer side face 22 and an inner face of the receiving recess 24 of the side sash 20.

Furthermore, as illustrated in FIG. 5, the leading end face 65 of the lower side-portion projection 64 provided to a rear face of the case 52 is made to contact the front face of the front wall 38 of the glass run channel-retaining member 36. Moreover, the connector 86 and the electric cable 82 of the connector-attachment cable 80 are moved past the lower edge (open area) of the receiving recess 24 to be positioned below a lower edge of the side sash 20.

Next, the receiver device 50 is moved toward the lower side relative to the side sash 20 while maintaining a state of contact between the leading end face 65 of the side-portion projection 64 and the front wall 38. When this is performed, as illustrated in FIG. 7, the entire receiver device 50 is positioned inside the receiving recess 24 in the side sash 20. Furthermore, although not illustrated in the drawings, the leading end face 63 of the upper side-portion projection 62 provided to the rear face of the case 52 contacts the front face of the front wall 38 of the glass run channel-retaining member 36. Furthermore, at this time, as illustrated in FIG. 7, the leading end face 59 of the protrusion 58 at the upper side of the receiver device 50 contacts a location PS3 (see FIG. 2) at the upper side of the recess 28 in the fixing face 26 of the receiving recess 24. Furthermore, although not illustrated in the drawings, the leading end face 61 of the protrusion 60 at the lower side of the receiver device 50 contacts a location PS4 (see FIG. 2) at the upper side of the recess 30 in the fixing face 26 of the receiving recess 24. Thus, as illustrated in FIG. 7, when the receiver device 50 is viewed along the front-rear direction, the double-sided tape 68 and the fixing face 26 are spaced apart from one another and substantially parallel to one another.

Next, the receiver device 50 is moved further toward the lower side relative to the side sash 20 while maintaining a state of contact between the leading end face 63 of the side-portion projection 62 and the front wall 38, and between the leading end face 65 of the side-portion projection 64 and the front wall 38. When this is performed, as illustrated in FIG. 8, the protrusion 58 and protrusion 60 of the receiver device 50 respectively enter the upper and lower recess 28 and recess 30 in the receiving recess 24. More specifically, an upper end portion of the protrusion 58 contacts an upper end portion 28C of the inclined face 28B of the recess 28, and an upper end portion of the protrusion 60 contacts an upper end portion 30C of the inclined face 30B of the recess 30. Also in this case, as illustrated in FIG. 8, when the receiver device 50 is viewed along the front-rear direction, the double-sided tape 68 and the fixing face 26 are still spaced apart from one another and substantially parallel to one another.

Figure 11:
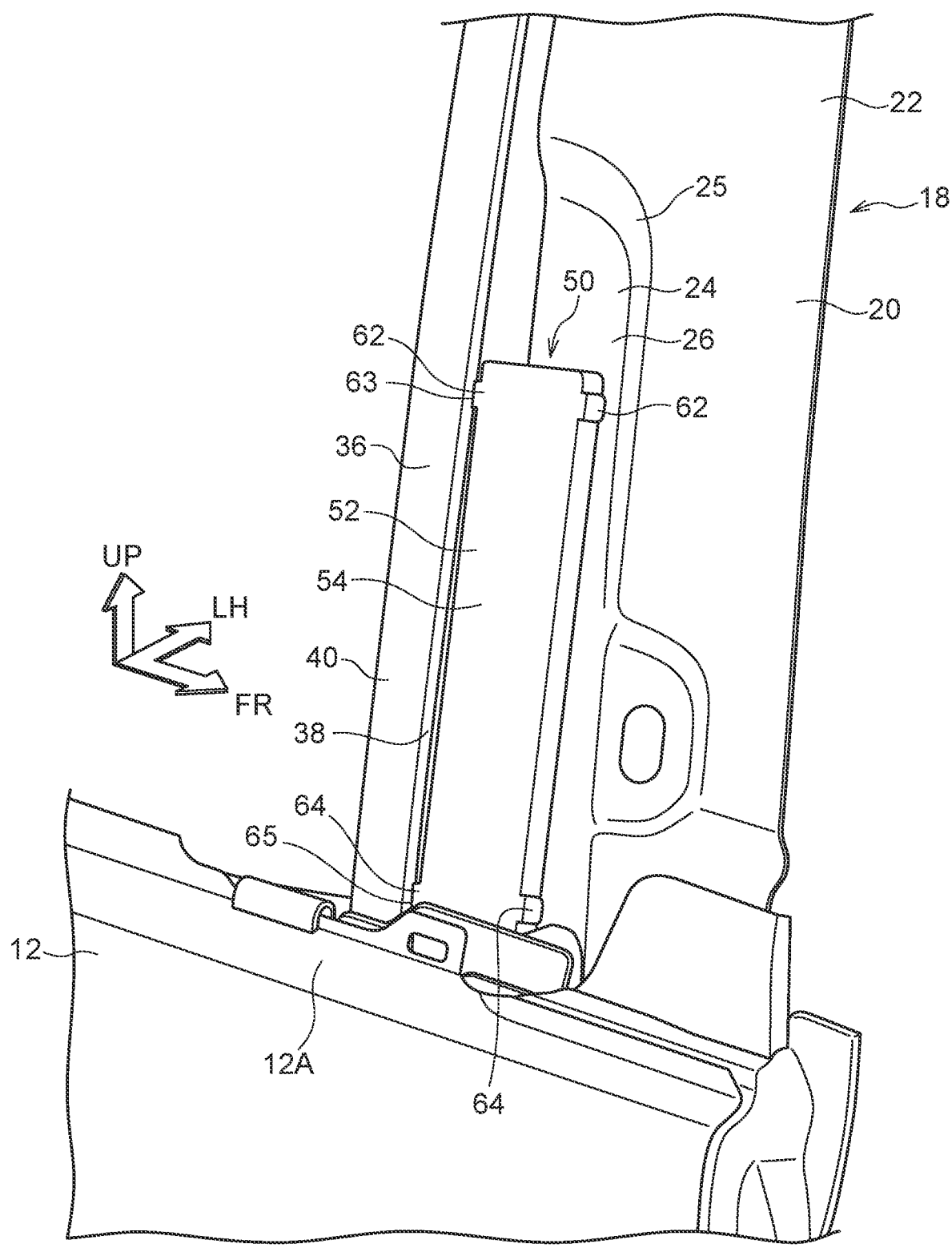
FIG. 11 is a perspective view similar to that in FIG. 2, illustrating a state when a fixing operation of the receiver device to the side sash is complete.

Next, the receiver device 50 is moved still further toward the lower side relative to the side sash 20 while maintaining the state of contact between the leading end face 63 of the side-portion projection 62 and the front wall 38, and between the leading end face 65 of the side-portion projection 64 and the front wall 38. When this is performed, as illustrated in FIG. 9, the upper end portion of the protrusion 58 contacts a central portion 28D of the inclined face 28B of the recess 28, and the upper end portion of the protrusion 60 contacts a central portion 30D of the inclined face 30B of the recess 30. In other words, the leading end face 59 of the protrusion 58 is spaced apart from the bottom face 28A of the recess 28, and the leading end face 61 of the protrusion 60 is spaced apart from the bottom face 30A of the recess 30. In this case, as illustrated in FIG. 9, when the receiver device 50 is viewed along the front-rear direction, the adhesive face 69 of the double-sided tape 68 is in contact with the fixing face 26. Thus, as illustrated by the phantom line in FIG. 5 and by FIG. 11, the receiver device 50 is fixed to the side sash 20 using the double-sided tape 68. The leading end face 63 of the side-portion projection 62 and the leading end face 65 of the side-portion projection 64 are both in contact with the front wall 38 at this time. Furthermore, a lower end portion of the receiver device 50 opposes a vehicle inner side face of an upper edge 12A of the door outer panel 12 in the vehicle width direction at this time.

Figure 10:
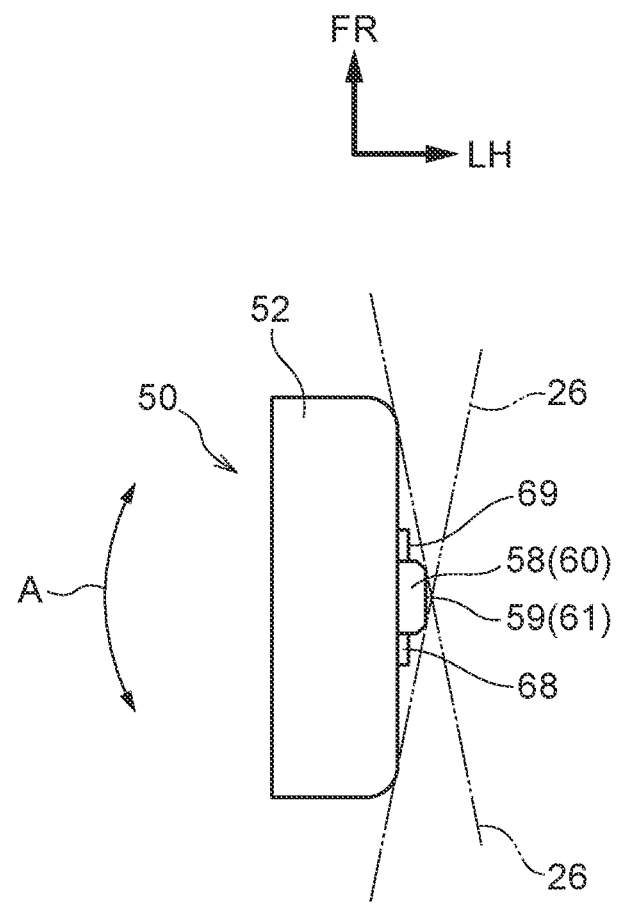
FIG. 10 is a bottom view of the receiver device positioned in a receiving recess.

Note that when the receiver device 50 is positioned inside the receiving recess 24 and the adhesive face 69 is not yet in contact with the fixing face 26, as illustrated in FIG. 10, the receiver device 50 might swing in an arrow A direction inside the receiving recess 24 centered on respective contact points between the protrusion 58 and the fixing face 26 and between the protrusion 60 and the fixing face 26. In such cases, a part of the inner face of the receiving recess 24 (including the fixing face 26) might contact a front end portion or a rear end portion of the vehicle inner side face of the case 52. However, even in such cases, the adhesive face 69 of the double-sided tape 68 does not contact the inner face of the receiving recess 24. In other words, the shapes of the side sash 20 and the receiver device 50 are set such that the adhesive face 69 of the double-sided tape 68 does not contact the inner face of the receiving recess 24, even in cases in which such swinging has occurred.

Furthermore, the depth Dp1 of the receiving recess 24 is larger than the distance Dp2 between the right side face of the case 52 and each of the leading end faces 59, 61 of the protrusions 58, 60. Thus, as illustrated in FIG. 9, the vehicle outer side face (right side face) of the case 52 is positioned further toward the vehicle inner side (left side) than the vehicle outer side face 22 of the side sash 20. Namely, the vehicle outer side face (right side face) of the case 52 does not project toward the vehicle outer side with respect to the vehicle outer side face 22 of the side sash 20.

When the receiver device 50 has been fixed to the side sash 20 using the double-sided tape 68 in this manner, a non-illustrated belt molding is attached to the upper edge 12A of the door outer panel 12. A weather strip is provided to this belt molding. The pillar garnish 44 is then attached to the side sash 20. The connector 86 of the connector-attachment cable 80 is then connected to a connector portion of the door locking device 48.

As described above, in the present exemplary embodiment, when the pair of protrusions 58, 60 provided to the receiver device 50 are in contact with the vehicle outer side face 22 or the fixing face 26 of the side sash 20, the adhesive face 69 of the double-sided tape 68 is spaced apart from the vehicle outer side face 22 and the fixing face 26. Then, when the pair of protrusions 58, 60 have been positioned in the pair of recesses 28, 30 by moving the receiver device 50 toward the lower side (in a predetermined direction) relative to the side sash 20 while maintaining the state of contact between the protrusions 58, 60 and the vehicle outer side face 22 or the fixing face 26, the adhesive face 69 of the double-sided tape 68 is fixed to the fixing face 26. In the present exemplary embodiment, the receiver device 50 is positioned at the vehicle outer side of the fixing face 26 when performing the operation to fix the receiver device 50 to the fixing face 26. Namely, it is not easy for an assembly worker to see the fixing face 26 when performing the operation to fix the receiver device 50 to the fixing face 26. However, the vehicle-mounted component attachment structure of the present exemplary embodiment enables the assembly worker to easily fix the receiver device 50 to the fixing face 26 of the side sash 20.

Furthermore, when the receiver device 50 has been fixed to the side sash 20 using the double-sided tape 68, movement of the receiver device 50 toward the rear relative to the side sash 20 is restricted by the side-portion projection 62 and the side-portion projection 64 of the receiver device 50 and the front wall 38 of the glass run channel-retaining member 36.

Furthermore, when the receiver device 50 has been fixed to the side sash 20 using the double-sided tape 68, movement of the receiver device 50 toward the vehicle inner side relative to the side sash 20 is restricted by the double-sided tape 68 and the fixing face 26 of the side sash 20.

The receiver device 50 is thereby fixed to the side sash 20 using the double-sided tape 68 in a state in which movement of the receiver device 50 toward the rear and the vehicle inner side relative to the side sash 20 has been restricted in this manner. There is accordingly a low risk of the receiver device 50 moving relative to the side sash 20 while the vehicle is traveling.

Furthermore, when the receiver device 50 has been fixed to the side sash 20, the receiver device 50 is positioned in an inner area of the receiving recess 24. Namely, the receiver device 50 does not project toward the vehicle outer side with respect to the vehicle outer side face 22 of the side sash 20. Thus, the receiver device 50 does not interfere with surrounding members (such as the belt molding or the weather strip).

Furthermore, the resin pillar garnish 44 that covers the receiver device 50 from the vehicle outer side is attached to a vehicle outer side face of the side sash 20. Exposure of the receiver device 50 at the vehicle outer side is thereby prevented by the pillar garnish 44. Furthermore, the resin pillar garnish 44 does not impair the exchange of wireless signals (radio waves) between external communication equipment (such as a smart key) and the antenna device 72 of the receiver device 50, and so the antenna device 72 is able to receive wireless signals transmitted by such communication equipment. Thus, when the antenna device 72 receives a wireless signal sent by a smart key, an unlocking signal generated by the antenna control device 74 is transmitted to the door locking device 48 through the connector-attachment cable 80. The electronic actuator of the door locking device 48 is thereby actuated so as to switch the door locking device 48 from the latched state to the unlatched state.

Although a vehicle-mounted component attachment structure according to an exemplary embodiment has been described above, the vehicle-mounted component attachment structure may undergo design modifications as appropriate within a range not departing from the spirit of the present disclosure.

For example, the vehicle-mounted component that is fixed to a vehicle configuration member using the double-sided tape 68 is not limited to the receiver device 50. For example, the vehicle-mounted component may be a display in the form of a film, or a flexible printed circuit board.

Moreover, the vehicle configuration member to which the vehicle-mounted component is fixed using the double-sided tape 68 is not limited to the side sash 20. For example, the configuration member may be a side sash of an A pillar or a C pillar of a vehicle. Alternatively, the configuration member may be a bonnet, a rear door, or an instrument panel of a vehicle.

For example, a receiving recess may be provided at a front edge of a vehicle outer side face of a rear sash of a front door, and a rear face of a glass run channel may be made to contact this front edge. In such a case, the rear face of the glass run channel corresponds to a "first positioning face" that contacts a front portion of a vehicle-mounted component that has been fixed to the receiving recess.

Whatever the configuration member may be, the vehicle-mounted component may be fixed to the bottom face (fixing face) of the receiving recess formed in the surface (vehicle outer side face) of the configuration member using the double-sided tape 68, and the vehicle outer side face of the configuration member may be covered by a resin component. By doing so, in cases in which the vehicle-mounted component provided in the receiving recess includes an antenna device, this antenna device is able to perform wireless communication with external communication equipment.

The number of protrusions provided to the vehicle-mounted component and the corresponding number of recesses provided in the configuration member may be three or more.

The fixing member may be configured by providing double-sided tape on both faces of a plate-shaped cushioning material.

The plural protrusions provided to the vehicle-mounted component and the plural recesses provided in the configuration member may be respectively arrayed in a different direction to the vertical direction.

What is claimed is:

1. A vehicle-mounted component attachment structure comprising:
    a configuration member of a vehicle, with a plurality of recesses spaced apart from one another in a predetermined direction and formed in a fixing face that configures a part of a surface of the configuration member;
    a vehicle-mounted component including a plurality of protrusions corresponding to the plurality of recesses; and
    a fixing member configured such that one face of the fixing member is fixed to a location of the vehicle-mounted component positioned between the plurality of protrusions, another face of the fixing member is spaced apart from the fixing face when the plurality of protrusions are contacting the fixing face, and the other face of the fixing member is fixed in a contact state to the fixing face when the plurality of protrusions have been positioned in the corresponding plurality of recesses.

2. The vehicle-mounted component attachment structure of claim 1, wherein:
    a receiving recess that is capable of receiving the vehicle-mounted component is formed in the surface of the configuration member; and
    the fixing face and the plurality of recesses are formed at a bottom face of the receiving recess.

3. The vehicle-mounted component attachment structure of claim 1, wherein the predetermined direction is a vertical direction.

4. The vehicle-mounted component attachment structure of claim 1, wherein the vehicle-mounted component is a receiver device capable of receiving a wireless signal from communication equipment.

5. The vehicle-mounted component attachment structure of claim 4, wherein:
    the fixing face is formed at a part of a vehicle outer side face of the configuration member; and
    a cover member made of resin and configured to cover the receiver device from a vehicle outer side is attached to the vehicle outer side face of the configuration member.

6. The vehicle-mounted component attachment structure of claim 5, wherein:
    the configuration member is a side sash made of metal and configuring a part of a vehicle door; and
    the cover member is a pillar garnish configured to cover a vehicle outer side face of the side sash.

7. The vehicle-mounted component attachment structure of claim 1, wherein the configuration member includes a first positioning face capable of contacting a front face or a rear face of the vehicle-mounted component.

8. The vehicle-mounted component attachment structure of claim 1, wherein the fixing face of the configuration member configures a second positioning face positioned further toward a vehicle inner side in a vehicle width direction than the vehicle-mounted component.

9. The vehicle-mounted component attachment structure of claim 1, wherein, when the other face has been fixed to the fixing face, leading ends of the plurality of protrusions are spaced apart from bottom faces of the corresponding plurality of recesses.

10. A vehicle-mounted component attachment method comprising:
    causing a plurality of protrusions provided at a vehicle-mounted component to contact a fixing face that configures a part of a surface of a configuration member of a vehicle and that is formed with a plurality of recesses spaced apart from one another in a predetermined direction, such that a fixing member that has one face fixed to a location of the vehicle-mounted component positioned between the plurality of protrusions has another face spaced apart from the fixing face;
    causing the vehicle-mounted component to move in the predetermined direction relative to the configuration member while maintaining a state of contact between the fixing face and the plurality of protrusions; and
    fixing the other face of the fixing member in a contact state to the fixing face by positioning the plurality of protrusions in the corresponding plurality of recesses.

* * * * *